United States Patent [19]

Sugino et al.

[11] Patent Number: 4,779,853
[45] Date of Patent: Oct. 25, 1988

[54] METHOD OF DETERMINING AND DAMPING VIBRATIONS

[75] Inventors: Masaru Sugino, Fujisawa; Shin Takehara, Machida, both of Japan

[73] Assignee: Nissan Motor Co., Ltd., Yokohama, Japan

[21] Appl. No.: 90,398

[22] Filed: Aug. 27, 1987

Related U.S. Application Data

[63] Continuation of Ser. No. 765,398, Aug. 14, 1985, abandoned.

[30] Foreign Application Priority Data

Aug. 16, 1984 [JP] Japan .................. 59-170927
Nov. 14, 1984 [JP] Japan .................. 59-238553
May 9, 1985 [JP] Japan .................. 60-96587

[51] Int. Cl.[4] .......................... F16F 5/00; F16F 9/10; B60K 5/12; F16M 7/00
[52] U.S. Cl. .................. 267/140.1; 180/300; 180/312; 188/378; 188/322.5; 267/64.15; 267/219; 267/152; 248/562; 248/636
[58] Field of Search ..................... 188/378-380, 188/280, 298, 322.5, 320; 267/140.1-141.7, 136, 152, 153, 35, 64.15, 217-220, 195, 292-294; 248/636, 562, 631; 180/300, 312

[56] References Cited

U.S. PATENT DOCUMENTS 4,418,897 12/1983 Hartel et al. ............... 267/140.1
4,420,060 12/1983 Kakimoto ................. 267/140.1 X
4,437,653 3/1984 Kakimoto ................. 267/140.1 X

FOREIGN PATENT DOCUMENTS

1172550 6/1964 Fed. Rep. of Germany .
3316177 11/1984 Fed. Rep. of Germany .
2536143 5/1984 France .
58-61345 4/1983 Japan ..................... 267/140.1
0124841 7/1983 Japan ..................... 267/140.1
0170934 10/1983 Japan ..................... 267/140.1
0184739 9/1985 Japan ..................... 267/140.1

Primary Examiner—Douglas C. Butler
Attorney, Agent, or Firm—Foley & Lardner, Schwartz, Jeffery, Schwaab, Mack, Blumenthal & Evans

[57] ABSTRACT

The method comprises determining a first resonant frequency of a system comprising a vibratory body, a supporting body and a vibration damping device disposed therebetween. Vibrations at the first resonant frequency are dampened by defining first and second chambers in the device which are separate from each other and communicate with each other through a passage configured to impart a second resonant frequency to fluid received within the passage which substantially equals the first resonant frequency.

5 Claims, 12 Drawing Sheets

METHOD OF DETERMINING AND DAMPING VIBRATIONS

This application is a continuation of application Ser. No. 765,398 filed Aug. 14, 1985, now abandoned.

BACKGROUND OF THE INVENTION

1. Field of the Invention

The present invention relates to a vibration damping system interposed between a vibratory body and a supporting body, and more particularly to an improvement of the vibration damping system including a device having two fluid chambers which are communicated through a hole with each other.

2. Description of the Prior Art

Recently a variety of vibration damping systems have been proposed to be disposed between a vibratory body such as a power unit and a supporting body such as a vehicle body in order to effectively damp the vibrations from the vibratory body. One of them is a power unit mounting device, such as the one disclosed in Japanese Patent Provisional (First) Publication No. 58-61345, through which the power unit is mounted on the vehicle body. The mounting device is provided with expandable two fluid chambers which are communicated through an orifice with each other for the purpose of improving vibration damping effect.

In such a power unit mounting device whose vibration damping effect is considered to be made due to resistance of fluid passing through the orifice, a so-called loss factor (tan δ) as a parameter of damping force is regarded as important like in a power unit mounting device made of a more rubber block. In this regard, the tuning of the mounting device is so made by alternating the diameter and the length of the orifice, that the maximum loss factor frequency is brought into coincidence with the frequency (about 10 Hz) of engine shake.

Figure 10:
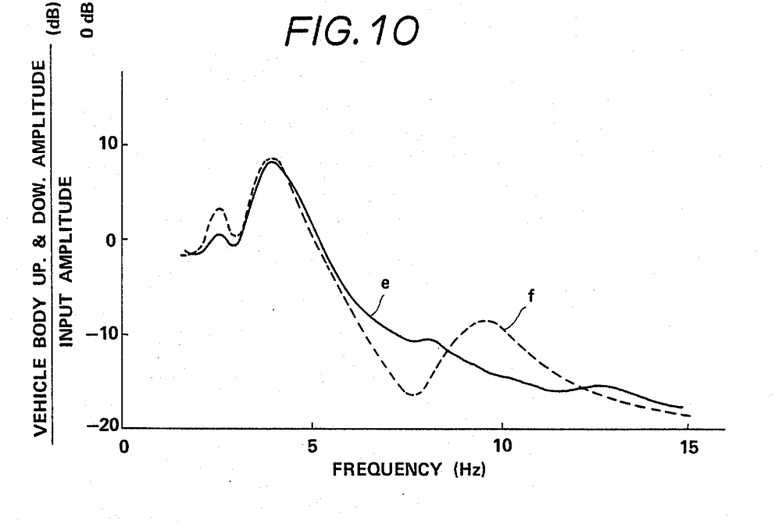
FIG. 10 is a graph showing the characteristics of vehicle body vibration transfer function upon excitation at the same phase and amplitude of the mounting device of FIG. 8 and a conventional mounting device respectively mounted on vehicles.

However, experiments have revealed that the power unit mounting device of the fluid filled type exhibits in practice vibration damping effect under the dynamic damper action of fluid within the orifice. Accordingly, in order to bring out the maximum dynamic damper effect, it is necessary to largely shift the resonance frequency of the fluid 5–10 Hz from the loss factor maximum frequency in which the resonance frequency is shifted 50–100 percent relative to the engine shake frequency. As a result, the fluid filled power unit mounting device cannot sufficiently exhibit its vibration damping ability and therefore cannot sufficiently reduce engine shake, thereby deteriorating an improvement effect in comfortableness to ride in a vehicle. This is shown in FIG. 10 of the present application, where a dotted curve f represents the vibration damping effect of a conventional power unit mounting device, such as that disclosed in Japanese Patent Provisional (First) Publication No. 58-61345, in which the maximum loss factor frequency is brought into coincidence with the engine shake frequency. It is notable that the vibration damping effect of the conventional power-unit mounting device deteriorates particularly in the frequency range where engine shake occurs.

SUMMARY OF THE INVENTION

A vibration damping system of the present invention consists of a vibration damping device interposed between a vibratory body and a supporting body. The device is provided with first and second fluid chambers which are separate from each other and filled with a fluid. A hole is formed between the first and second fluid chambers to allow the fluid to flow through the hole. It is to be nolted that the vibration damping system is so arranged that the resonance frequency of the fluid within the hole is substantially coincident with a resonance frequency of a resonant body including the whole vibration damping device and the vibratory body upon closing the hole. Consequently, the vibration damping device of the fluid filled type can sufficiently exhibit its vibration damping ability, thereby sharply reducing vehicle vibrations particularly engine shake of an automotive vehicle.

BRIEF DESCRIPTION OF THE DRAWINGS

The features and advantages of the vibration damping system of the present invention will be more clearly appreciated from the following description taken in conjunction with the accompanying drawings in which like reference numerals designate corresponding parts and elements, and in which.

DETAILED DESCRIPTION OF THE INVENTION

Figure 1:
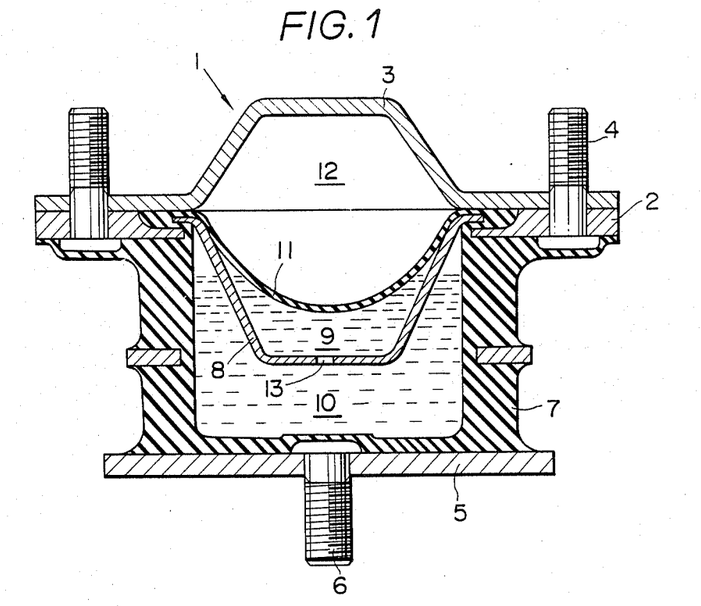
FIG. 1 is a vertical cross-sectional view of a mounting device of a first embodiment of a vibration damping system in accordance with the present invention.

Referring now to FIG. 1, there is shown a mounting device 1 (engine mount) foro a vibratory body such as a power unit of an automotive vehicle. The mounting device 1 forms part of a first embodiment of a vibration damping system of the present invention. The mounting device 1 comprises a power unit side support member 2 which is secured together with a plate member 3 to a power unit (not shown) as the vibratory body by means of bolts 4. A vehicle body side support member 6 is secured to a vehicle body (not shown) as a supporting body by means of a bolt 6. A hollow cylindrical or cup-shaped elastic (elastomeric) member 7 has upper and lower end sections which are respectively bonded to the power unit side and vehicle body side support members 2, 5 under adhesion due to baking. A partition plate 8 is disposed in the hollow of the elastic member 7 to define upper and lower fluid chambers 9, 10 on the opposite sides of the partition plate 8. Additionally, a diaphragm 11 is provided in such a manner as to define the upper fluid chamber 9 by the lower surface thereof while defining an air chamber 12 between the upper surface thereof and the plate member 3. The partition plate 8 is formed at its central part with an orifice 13 through which the upper and lower fluid chambers 9, 10 are communicated with each other. The upper and lower fluid chambers 9, 10 are filled with a fluid such as a hydraulic fluid. This embodiment is so arranged that the resonance frequency of the fluid within the orifice 13 is about $f_0$ (Hz) which is the resonance frequency of the power unit based on the vibration of the vehicle body upon closing the orifice 13 which frequency is critical as of so-called engine shake. Additionally, the transverse cross-sectional area of the orifice 13 is within a range of 0.15 to 0.5 cm$^2$.

Figure 2:
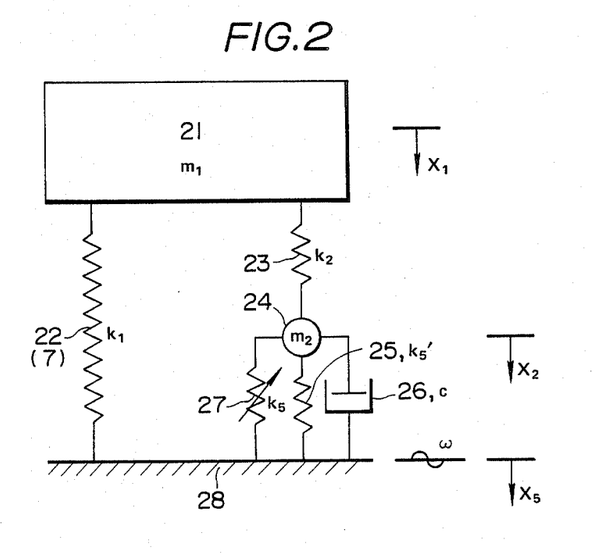
FIG. 2 is a diagram of a mechanical model of the mounting device of FIG. 1.

The principle and operation of the mounting device of FIG. 1 will be discussed hereinafter with reference to a mechanical model of FIG. 2. In FIG. 2, the reference numeral 21 denotes a mass point (or the power unit) having a mass corresponding to a load supported by the mounting device 1; 22 a spring having a spring constant in a support direction of only the elastic member 7; 23 a spring having a difference between a spring constant of the whole mounting device upon closing the orifice 13 and the spring constant of the spring 22; 24 a mass point having an equivalent mass obtained by multiplying the ratio of the effective pressure receiving area $A_1$ of the elastic member 7 and the transverse cross-sectional area $A_2$ of the orifice 13 by the mass of the fluid within the orifice; 25 a spring having the equivalent value in spring constant of the diaphragm 11 and the air chamber 12; 26 a daphpot made by a resistance generated during the passage of the fluid through the orifice; and 27 a spring made by pressure variation and given by a formula of $$\frac{A_1}{A_2}\left(\frac{A_1}{A_2} - 1\right)m_2 X_2/X_2.$$

The reference numeral 28 denotes the vehicle body. It is to be noted that the mass point 21 has a mass $m_1$; the spring 22 has a spring constant $K_1$, the spring 23 has a spring constant $k_2$; the spring 25 has a spring constant $k_5'$; the dashpot 26 has a damping coefficient c; the spring 27 has a spring constant $k_5$; and the fluid within the orifice has a mass $m_2$.

Now, engine shake is generated in the vicinity of the natural frequency of an engine mount system including the power unit and the whole mounting device, and input as a displacement input from a vehicle body side thereby to excite the vibration of an engine or the power unit. Since a response comes out also in the vehicle body, it is sufficient to lower the value of a transmitted force to the vehicle body at the natural frequency of the engine mount system in case where a displacement excitation is made from the vehicle body. The transmitted force $F_d$ to the vehicle body is obtained from the equation of motion in the model of FIG. 2 as follows:

$$\left|\frac{F_d}{m_1 X_5 w_1^2}\right| = \frac{\Omega^2}{A}(1 + v)^2 \sqrt{\frac{q^4 + [\{p + vB/(\mu A)\}^2 + \{p + v/\mu(1 + v)\}^2]q^2 + \{p + vB/(\mu A)\}^2}{[q^2 + \{p + vB/(\mu A)\}^2]^2}} \quad (1)$$

where $\Omega = \omega/\omega_1$; $\omega$ is excitation frequency;

$\omega_1 = \sqrt{k_1/m_1}$ ; $A = \Omega^2 - 1 - v$; $B = \Omega^2 - 1$; $P = \Omega_2^2 - \Omega^2$;

$\Omega_2 = \omega_2/\omega_1 = \sqrt{k_5'/m_2'}/\omega_1$ ; $q = 2\zeta_2 \Omega_2 \Omega$;

$\zeta_2 = c/(2\sqrt{m_2' k_3'})$; $m_2' = (A_1/A_2)^2 m_2$;

$k_5' = (A_1/A_3)^2 k_5$;

$A_3$ is an effective pressure receiving area of the diaphragm in connection with the air chamber; $\mu = m_2'/m_1$; and $\nu = k_2/k_1$.

Figure 3:
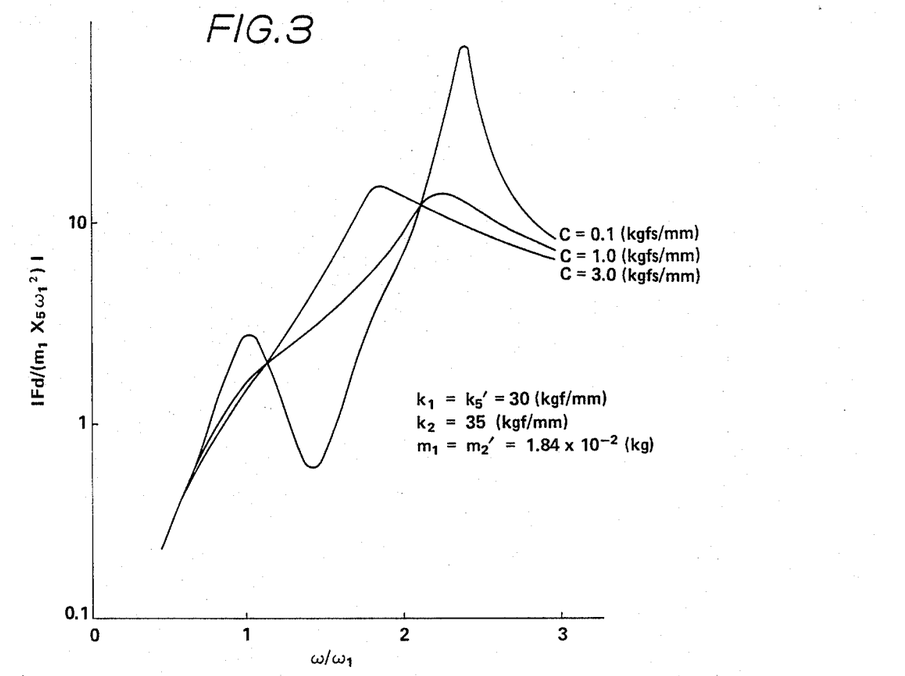
FIG. 3 is a graph showing the relationship between frequency and transmitted force on the assumption that the resonance frequency of fluid within an orifice is coincident with the resonance frequency of the mounting device upon closing the orifice.
Figure 5:
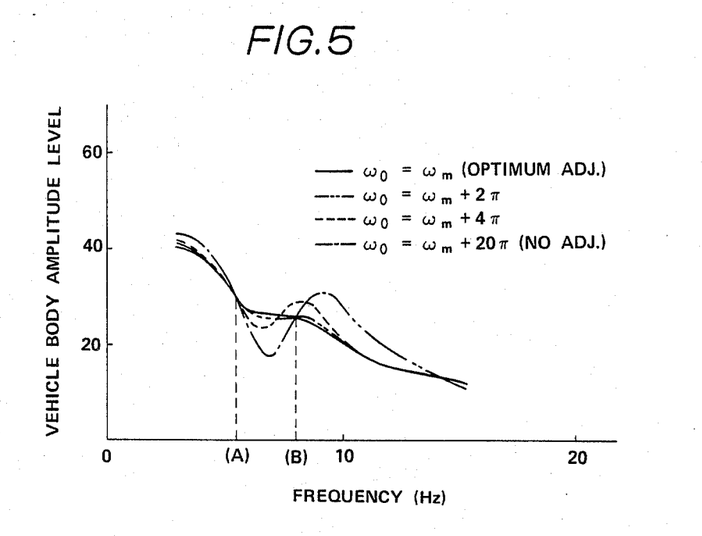
FIG. 5 is a graph showing the characteristics of the vehicle vibration amplitude under a condition in which the resonance frequency of the fluid within the orifice is adjusted to be equal to the resonance frequency of the mounting device upon closing the orifice.

The values of the equation (1) upon varying frequency $\Omega$ indicate a variety of curves as shown in FIG. 3, in which such curves pass a certain value (at two certain points) not depending on $\zeta_2$, at frequencies (corresponding to the certain points A and B in FIG. 5) given by the following equation:

$$Q^2 = \frac{1}{4\mu} [2\mu(\Omega_2^2 + 1 + \nu) = \frac{(\nu + 2)}{H\nu} \pm \sqrt{\left\{ 2\mu(Q_2^2 + 1 + \nu) + \frac{(\nu + 2)}{1 + \nu} \right\}^2 - 8\mu\{2\mu(1 + \nu)\Omega_2^2 + 2\nu\}} \quad (2)$$

In order to minimize the value of the equation (1), it is necessary to suitably determine these two certain values, i.e., to obtain their peak or maximum value. The vehicle body is in a mass region at the frequency of engine shake and therefore it is necessary that the inclination of a line segment connecting the values of the equation (1) at the frequencies of the equation (2) becomes about 12 dB/oct in order to obtain a condition where the vibration amplitude of the vehicle body at the two frequencies (at the points A and B in FIG. 5) are made equal and the peak values are attained. This condition is expressed by the following equation:

$$\Omega_2^2 = 1 + \nu - \frac{\nu(2 + \nu)}{2\mu(1 + \nu)} \quad (3)$$

$$\frac{\omega_o^2}{\omega_m^2} = 1 + \frac{\nu^2}{2\mu(1 + \nu)^2}$$

where $$\omega_o^2 = \frac{\nu}{\mu} \omega_1^2 + \omega_2^2 \ldots$$

the resonance frequency of the fluid within the orifice; and $\omega_m^2 = (1+\nu)\omega_1^2 \ldots$ the resonance vibration of the system including $m_1$, $k_1$ and $k_2$, i.e., the resonance frequency of the engine mount system upon closing the orifice.

The second term of the right members of the equation (3) is usually small and accordingly ignored, so that the equation (3) becomes the following equation:

$$\omega_o = \omega_m \quad (3')$$

Thus, it will be appreciated that, in order to equalize the vibration amplitudes at the two points (the points A and B in FIG. 5), it is very effective to make equal the resonance frequency of the fluid within the orifice to the resonance frequency of the engine mount system upon closing the orifice.

FIG. 3 shows the values of the equation (1) upon which the equation (3') is realized. As seen from FIG. 3, the value of $|Fd/(m \times 5\omega_1^2)|$ at the frequencies of the two certain points can be made the maximum, i.e., can take their peak values by appropriately determining the damping coefficient c of the dashpot 16 in FIG. 2. The damping coefficient c does not depend on the length of the orifice but largely depends on the value of $A_1/A_2$. In general, $A_1$ is 15 to 50 cm$^2$ in the mounting device of the fluid filled type for the power unit, so that the orifice transverse cross-sectional area $A_2$ for making the maximum the value of $|Fd/(m_1 \times 5\omega_1^2)|$ corresponds to 0.15 to 0.5 cm$^2$.

Consequently, in order to minimize the vibration amplitude of the vehicle body during engine shake and to be made insensitive to the frequencies, it is sufficient that the transverse cross-sectional area of the orifice is set within a range of 0.15 to 0.5 cm$^2$ and additionally the resonance frequency of the fluid within the orifice is approximately conincident with the resonance frequency of the engine mount system upon closing the orifice.

Figure 4:
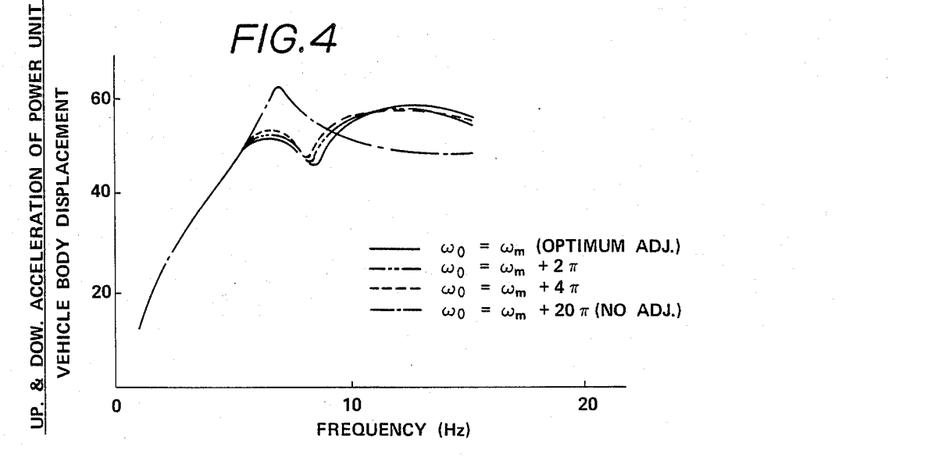
FIG. 4 is a graph showing the characteristics of the upward and downward acceleration of a power unit under a condition in which the resonance frequency of the fluid within the orifice is adjusted to be equal to the resonance frequency of the mounting device upon closing the orifice.
Figure 6:
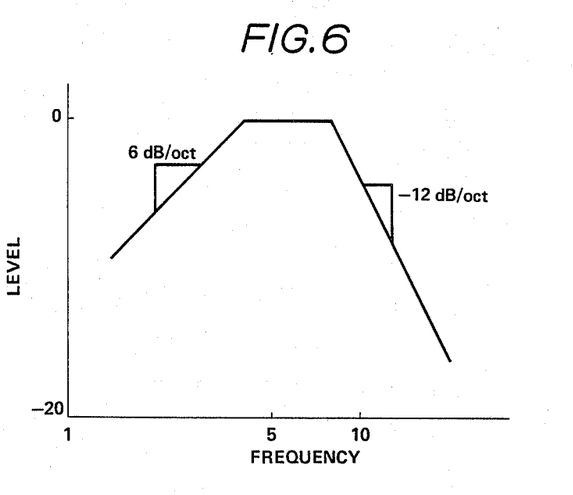
FIG. 6 is a graph showing the characteristics of human's vibration sensitivity according to ISO.

A concrete method for adjusting the resonance frequency of the fluid within the orifice is to change the length of the orifice or the specific gravity of the fluid. In this connection, vibration excitation experimental data shown in FIGS. 4 and 5 were obtained upon adjustment of the fluid within the orifice being made in accordance with the above-mentioned method. The data of FIGS. 4 and 5 relate respectively to upward and downward acceleration of the power unit/upward and downward amplitude of the vehicle body and to upward and downward vibration displacement of the vehicle body upon changing the resonance frequency of the fluid within the orifice at intervals of 1 Hz from a case (as a center) where the corresponding resonance frequency was not adjusted at all. The experiments to obtain the data were conducted by vibrating or exciting two front wheels of the vehicle in a condition in which phase was constant and amplitude was constant (2 mm). It is to be noted that the data of FIG. 5 were obtained by using a filter exhibiting human's vibration sensitivity and according to ISO (International Organization for Standardization) as shown in FIG. 6. As seen from FIG. 5, the vibration amplitude of the vehicle body becomes small in the cases where the resonance frequency of the fluid within the orifice was adjusted in accordance with the above-mentioned method; however, such an effect sharply deteriorates in the case where the resonance frequency of the fluid within the orifice shifts to become higher 2 Hz or more than the resonance frequency of the engine mount system upon closing the orifice. In contrast with this, in the case the resonance frequency of the fluid shifts to become lower than that of the engine mount system, there arises no greater deterioration in the effect. However, it is practically impossible to lower 2 Hz or more the resonance vibration of the fluid within the orifice relative to the resonance frequency of the engine mount system in case where the transverse cross-sectional area of the orifice is within the range of 0.15 to 0.5 cm$^2$, because the length of the orifice will become 30 cm thereby to raise problems in size. In this regard, it can be said that a proper allowable range for the equation (3') is given by the following equation:

$$\frac{\omega_o}{2\mu} = \frac{\omega_m}{2\mu} \pm 2 \text{ (Hz)} \quad (4)$$

While discussion has been made for only the fluid filled engine mount, it will be understood that the principle of the present invention is applicable to other various mounting devices such as ones using a fluid filled bushing and a fluid filled body mounts.

Figures 7A, 7B:
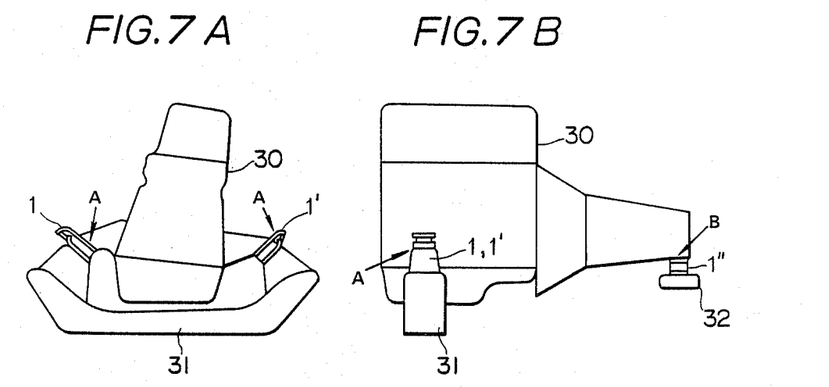
FIGS. 7A and 7B are schematic illustrations of a second embodiment of the vibration damping system in accordance with the present invention, including a plurality of mounting devices.

FIGS. 7A and 7B illustrate a second embodiment of the vibration damping system of the present invention, which comprises three mounting devices 1, 1', 1" through which the power unit 30 is mounted on a vehicle body 31, 32. It will be understood that the power unit is usually supported by a plurality of mounting devices as shown in FIGS. 7A and 7B and that it is usual that the frequency at which large vibration is generated varies depending upon locations for supporting the power unit 30 under a condition where the power unit generates vibrations at various frequencies.

In this embodiment, the power unit 30 is provided at its front part with installation sections A, A and at its rear part with an installation B. The installation sections A, A are supported by the mounting devices 1, 1' attached to a laterally extending member 31 of the vehicle body while the installation section B is supported by the mounting device 1" attached to another laterally extending member 32 of the vehicle body. It is to be noted that each of the mounting device 1, 1', 1" is so constructed and arranged that the resonance frequency of the fluid within the orifice is coincident with that of a resonant body including the power unit and the mounting device upon closing the orifice with an optimum value for the location at which each mounting device is disposed. Accordingly, the mounting devices 1, 1', 1" have different resonance frequencies of the fluid within the orifice, respectively.

With this arrangement, each mounting device can damp effectively vibrations at a most critical frequency for the location at which each mounting device is disposed. Accordingly, effective damping can be made on vibrations of a plurality of modes generated by displacement of an automotive vehicles body, thereby greatly improving ride-in comfortableness of the vehicle. In this regard, in a conventional vibration damping system in which a power unit is supported at a plurality of locations thereof in a similar manner to the arrangement of FIGS. 7A and 7B, all mounting devices used in the system are the same in characteristics so that it is impossible to effectively damp vibrations at critical frequencies which are different at the locations for supporting the power unit.

As will be appreciated from the above discussion, the vibration damping system of the present invention employs the fluid filled mounting device which is so configurated that the resonance frequency of the fluid within the orifice is coincident with that of the resonant body including the whole mounting device and the power unit upon closing the orifice of the mounting device. Therefore, the vibration damping ability of the fluid filled mounting device for the power unit can be sufficiently exhibited, thus sharply reducing engine shake and the like of automotive vehicles.

Figure 8:
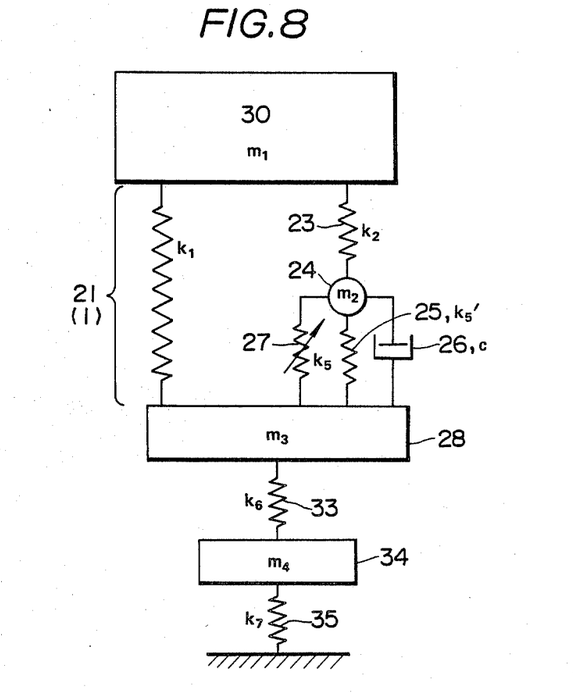
FIG. 8 is a diagram similar to FIG. 2, but showing the mechanical model of the mounting device of a third embodiment of the vibration damping system in accordance with the present invention.

FIG. 8 illustrates a third embodiment of the vibration damping system of the present invention which is similar to the embodiment of FIG. 2 with the exception that the resonance frequency of the fluid within the orifice and the resonance frequency of a resonant body including the whole mounting device and the vibratory body upon closing the orifice of the mounting device are coincident with the frequency of engine shake. The vibration damping system of this embodiment comprises the mounting device which has the same construction as that of FIG. 1. In this embodiment, as illustrated in the mechanical model of FIG. 8, suspensions 33, a unsprung weight 34, and tires 35 are taken into consideration in addition to the elements shown in FIG. 2. It is to be noted that the mass (of the vehicle body 28) supported by the front suspension 33 is $m_3$; the spring constant corresponding to two suspensions 33 is $k_6$, the unsprung mass of the two front suspensions is $m_4$; and the spring constant of two tires 35 in the bouncing direction is $k_7$.

Figure 9:
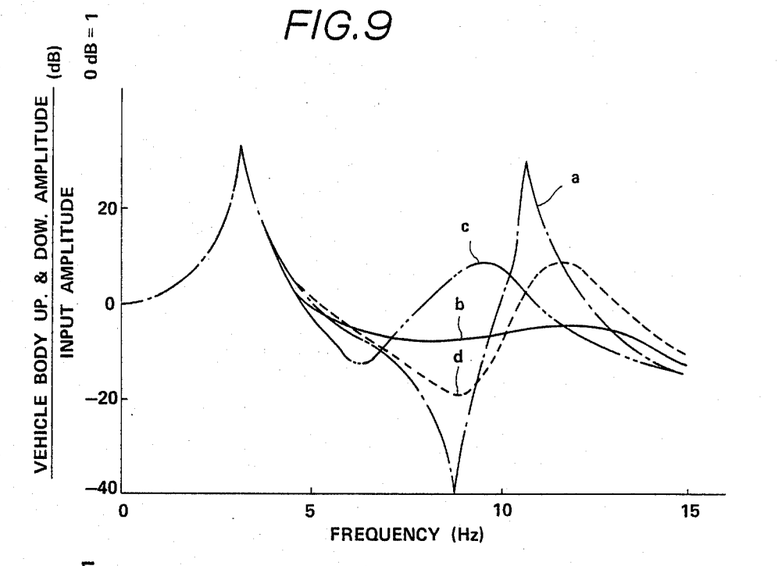
FIG. 9 is a graph showing the characteristics of calculated values of vehicle body upward and downward vibration amplitude relative to input vibration amplitude to the vehicle body under a condition in which the resonance frequency of the fluid within the orifice of the mounting device is altered.

With the above-discussed arrangement, vibration level of the vehicle body was calculated under a condition where only the orifice 13 was changed maintaining constant the other matters and factors thereby to obtain a result shown in FIG. 9. In FIG. 9, a line a respresents a case where the damping coefficient $c = \infty$ and the orifice 13 was closed, in which a peak in the vicinity of 11 Hz indicates the resonance frequency of the resonant body including the whole mounting device and the vibratory body upon closing the orifice 13, the frequency being the same as the frequency of engine shake. A line b respresents a case where the resonance frequency of the fluid within the orifice 13 was set at 11 Hz which was the same as the frequency of engine shake. A line c represents a case where the frequency of the fluid within the orifice 13 was set at 20 Hz which was higher than the engine shake frequency. A line d represents a case where the frequency of the fluid within the orifice 13 was set at 5 Hz which was lower than the engine shake frequency. In case of the lines b, c and d, the damping coefficient c is 0.4. As is apparent from FIG. 9, the upward and downward vibration amplitude of the vehicle body relative to the input vibration amplitude is sharply lowered in the case (indicated by the line b) where the resonance frequency of the fluid within the orifice 13 is set at 11 Hz which is the same as the engine shake frequency.

FIG. 10 shows experimental data of transfer function of vibration of the mounting device of the third embodiment in which the resonance frequency of the fluid within the orifice was approximately coincident with the engine shake frequency (about 11 Hz) upon actual closing of the orifice, and of a conventional engine mount device in which the loss factor maximum frequency was coincident with the engine shake frequency. The experimental data were obtained upon experiments conducted by vibrating or exciting at the same vibration phase and amplitude two front wheels of a vehicle on which each of the third embodiment mounting device and the conventional mounting device was installed. In FIG. 10, a line e represents the data of the third embodiment mounting device while a line f represents the data of the conventional mounting device. As is apparent from FIG. 10, the mounting device of the third embodiment could sharply lower vibrations due to engine shake as compared with the conventional mounting device.

FIGS. 11, 12A, 12B and 13 illustrate a fourth embodiment of the vibration damping system according to the present invention which comprises a supporting device 127 for the power unit. In connection with the supporting device used in an automotive vehicle, both the power unit and a vehicle body serve as vibratory members; however, the power unit and the vehicle body are hereinafter referred to as a vibratory body and supporting body, respectively, for the purpose of convenience of illustration.

Figure 11:
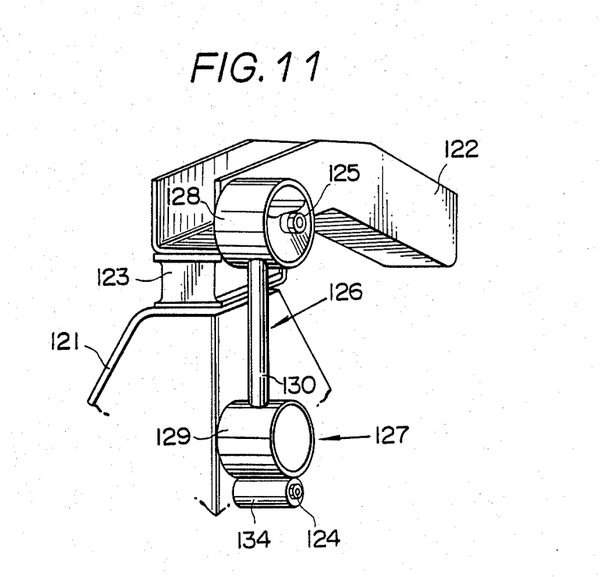
FIG. 11 is a perspective view of a fourth embodiment of the vibration damping system in accordance with the present invention, showing a power unit supporting device including a dynamic damper.

As shown in FIG. 11, the supporting device 127 of the power unit includes a first bracket 121 securely attached to the vehicle body. A mount unit 123 consisting of an elastometic member such as a rubber block is securely interposed between the first bracket 121 and a second bracket 122 securely attached to the power unit. A plurality of mount units (not shown) having the same construction as the unit 123 are disposed to elastically support the power unit on the vehicle body. Additionally, a dynamic damper 126 is disposed in such a manner as to connect the power unit and the vehicle body. More specifically, the dynamic damper 126 is connected at one end thereof with the vehicle body by means of a bolt 124 and at the other end thereof with the second bracket 122 by means of a bolt 125. It will be understood that the mount unit 123 and the dynamic damper 126 constitute as a whole the supporting device 127 (the vibration damping system) for the power unit.

Figure 12A:
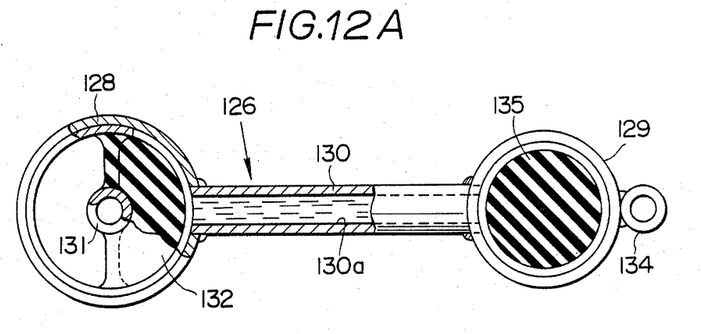
FIG. 12A is a transverse cross-sectional view of the dynamic damper of FIG. 11.
Figure 12B:
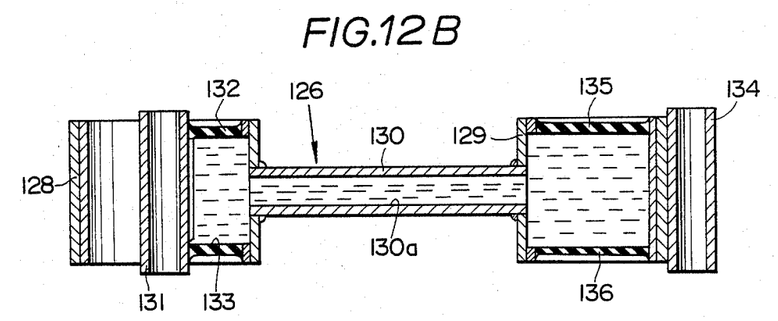
FIG. 12B is a vertical cross-sectional view of the dynamic damper of FIG. 12A.

As best shown in FIGS. 12A and 12B, the dynamic damper 126 consists of generally cylindrical first and second frame members 128, 129 which are connected with each other by means of a tube member 130 having a hole or passage throughout the length thereof. More specifically, the tube member 130 is fixed at one end thereof to the first frame member 128 and at the other end thereof to the second frame member 129 by way of welding or the like. Movably disposed at the central portion inside the first frame member 128 is a first installation member 131 which is secured to the second bracket 122 by the bolt 125. A first elastic or elastomeric member made of rubber or the liek is securely disposed between the installation member 131 and the inner peripheral surface of the first frame member 128. The first elastic member 132 is bonded to the installation member 131 and to the inner peripheral surface of the first frame member 128 by way of adhesion due to baking or the like. The first elastic member 132 connects the first installation member 131 with the first frame member 128 allowing an elastic relative movement therebetween, while defining a first fluid chamber (hollow) 133 between it and the inner peripheral surface of the first frame member 128. The first fluid chamber 133 is filled with an incompressible fluid such as oil and expands and contracts in accordance with the deformation of the first elastic member 132, i.e., with the relative displacement between the first frame member 128 and the installation member 131.

The second frame member 129 is provided at its outer peripheral surface with a second installation member 134. The installatioln member 134 is fixed to the frame member 129 by way of welding or the like and connected to the vehicle body by the bolt 124. The opposite open ends of the second frame member 129 are closed with second elastic or elastomeric members 135 made of rubber or the like, thereby defining a second fluid chamber (hollow) 136 among them and the inner peripheral surface of the second frame member 129. The second fluid chamber 136 is filled with the incompressible fluid same as the first fluid chamber 133 and is in communication with the first fluid chamber 133 through the hole 130a of the tube member 130, so that the second fluid chamber 136 expands and contracts following the expansion and contraction of the first fluid chamber 133.

The manner of operation of the power unit supporting device 127 will be hereinafter discussed with reference to a mechanical model of FIG. 13.

As the power unit vibrates, a relative displacement is made between the first frame member 128 and the first installation member 131 thereby to make a volume change in the first fluid chamber 33, so that the incompressible fluid flows between the first and second fluid chambers 133, 136 through the hole 130a of the tube member 130. Accordingly, the dynamic damper 126 constitutes a vibration system whose characteristics is determined by the mass $m_2$ of the incompressible fluid within the hole 130a, the effective pressure receiving area $A_1$ of the first fluid chamber 133, the effective pressure receiving area $A_3$ of the second fluid chamber 136, the cross-sectional area $A_2$ of the hole 130a, the spring constant $k_2'$ of the first elastic member 132, and the spring constant $(A_1/A_3)^2 k_5'$. In FIG. 13, the character $k_1'$ denotes the spring constant of the mount unit 123. The resonance frequency $f_0$ of the vibration system is therefore given by the following equation:

$$f_o = \frac{1}{2\pi} \sqrt{\frac{k_2 + k_3 + (A_1/A_3)^2 k_5}{(A_1/A_2) \cdot m_2}} \quad (5)$$

The above equation (5) can be rewritten to the following equation by using a spring constant $k_3$ corresponding to a fluctuation amount due to the flow of the incompressible fluid as discussed after:

$$f_o = \frac{1}{2\pi} \sqrt{\frac{k_2 + (A_1/A_3)^2 k_5}{(A_1/A_2)^2 \cdot m_2}} \quad (5')$$

Figure 13:
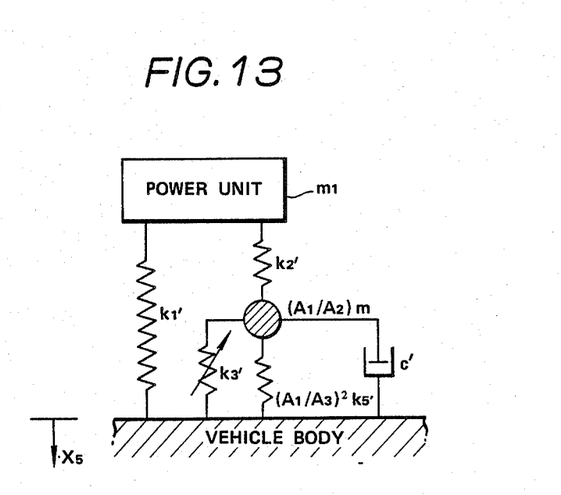
FIG. 13 is a diagram showing the mechanical model of the supporting device of FIG. 11.

Consequently, the vibration system of the supporting device 127 is represented as a whole as shown in FIG. 13, so that the characteristics of the vibration system of the dynamic damper 126 is determined by a spring constant $K_2 k_3 \{(A_1/A_3)^2 k_5\}$, a damping coefficient $c'$, and an equivalent mass $\{(A_1/A_2).m\}$. It is to be noted that spring constant $k_3$ corresponds to the fluctuation amount due to the flow of the incompressible fluid and has a value expressed by the following equation:

$$k^3 = \frac{A_1}{A_2} \left( \frac{A_1}{A_2} - 1 \right) m_2 \cdot \omega^2 \quad (6)$$

where $\omega$ is angular frequency.

Therefore, as apparent from the equation (5'), the dynamic damper 126 of the supporting device is so arranged that its resonance frequency $f_0$ is set at a desirable value by changing the pressure receiving area ratio $(A_1/A_3)$ or the area ratio $(A_1/A_2)$, thereby suppressing vibrations at a desired frequency. In order to effectively prevent engine shake in connection with the power unit supporting device 127 of an automotive vehicle, it is preferable to set the resonance frequency of the dynamic damper 126 at a value in the vicinity of 10 Hz. Such setting of the resonance frequency is accomplished only changing the pressure receiving area in this supporting device 127, so that the resonance frequency of the dynamic damper 126 can be set at a value in the vicinity of 10 Hz without rendering the dynamic damper 126 large-sized and increasing the weight of the dynamic damper. As a result, vibrations of the power unit in a frequency range in the vicinity of 10 Hz are effectively suppressed by the dynamic damper 126, thus preventing engine shake to improve ride-in comfortableness.

Figure 14:
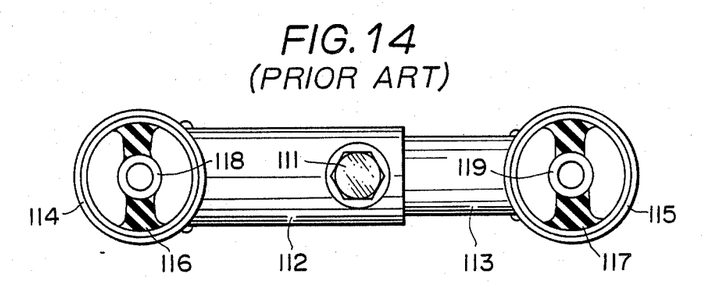
FIG. 14 is a plan view of a dynamic damper of a conventional power unit supporting device.
Figure 15:
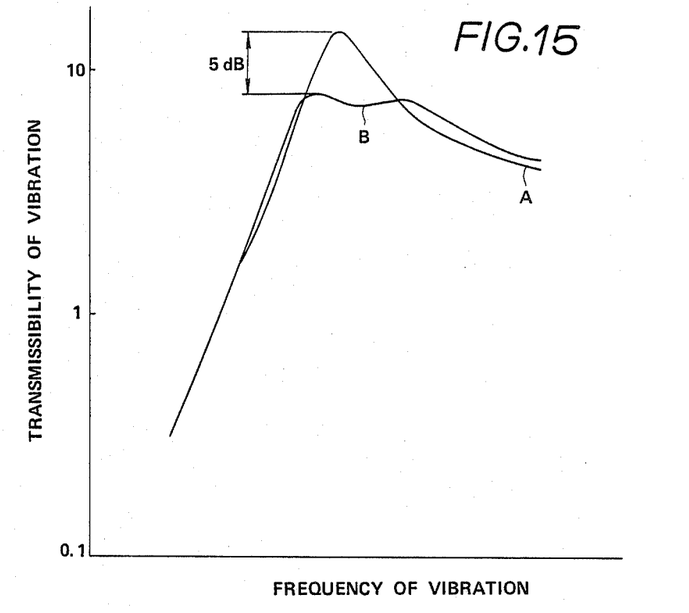
FIG. 15 is a graph showing transmissibility of vibration in terms of frequency of vibration.

FIG. 15 shows experimental data of transmissibility of vibration, in which a line A represents the data of a power unit supporting device consisting of a conventional dynamic damper as shown in FIG. 14 while a line B represents the data of the power unit supporting device consisting of the dynamic damper of FIGS. 12A and 12B. As seen from FIG. 15, it has been proved that the power unit supporting device consisting of the dynamic damper of FIGS. 12A and 12B improves vibration damping effect about 5 dB in the vicinity of the maximum value of vibration transimissibility relative to the power unit supporting device consisting of the conventional dynamic damper as shown in FIG. 14. The dynamic damper shown in FIG. 14 includes arms 112, 113 which are secured to each other by means of a bolt 111. Cylindrical members 114, 115 are secured to the arms 112, 113, respectively. The cylindrical member 114 is provided with an installation member 18 in such a manner that the installation member 18 is elastically movably connected through a rubber-like elastic member 16 to the inner peripheral surface of the cylindrical member 114. The cylindrical member 115 is provided with an installation member 18 in such a manner that the installation member 19 is elastically movably connected through a rubber-like elastic member 117 to the inner peripheral surface of the cylindrical member 115. One of these installation members 18, 19 is securely connected to the supporting body (not shown) such as a vehicle body while the other is securely connected to the vibratory body (not shown) such as a power unit. The thus arranged dynamic damper of FIG. 14 constitutes a vibration system in which the bolt 111 and the arms 112, 113 serves as a mass M and the elastic members 116, 117 serve as a spring element S, thereby suppressing vibrations of the vibratory body in a certain frequency range.

Figure 16:
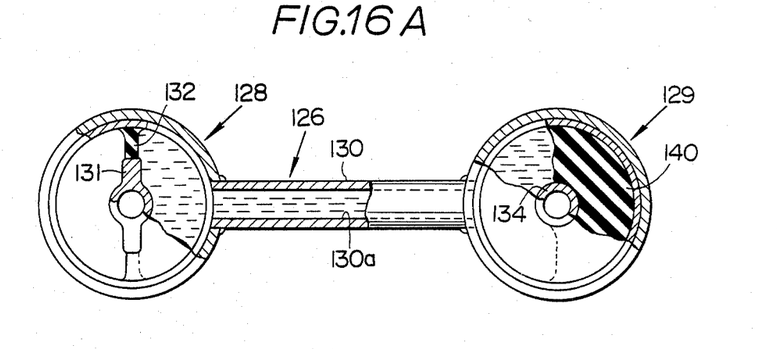
FIG. 16A is a transverse cross-sectional view similar to FIG. 12A but showing a modifiled example of the dynamic damper.
FIG. 16B is a vertical cross-sectional view of the dynamic damper of FIG. 16A.

FIGS. 16A and 16B illustrate a modified example of the dynamic damper 126 which is similar to that of FIGS. 12A and 12B with the exception that the second installation member 134 is located inside the frame member 129 and elastically movably connected through a second elastic or elastomeric member 140 to the inner peripheral surface of the frame member 129, the elastic member 140 being bonded to the installation member 134 by way of adhesion due to baking. A second fluid chamber 141 is defined within the second elastic member 140 to be filled with the incompressible fluid.

With this arrangement in a state where the installatioln member 131 is securely connected to the side of the vibratory body such as the power unit while the installation member 134 is securely connected to the side of the supporting body such as the vehicle body, when vibratory body vibrates at frequencies in the vicinity of the resonance frequency (a first resonance frequency) of the fluid within the tube member 130, the displacement of the installation member 134 is considered to be zero relative to the displacement of the installation member 131 since the spring constant of the second elastic member 140 is large, thus functioning as a dynamic damper under the resonance action of the fluid within the tube member 130 as same as in the embodiment of FIGS. 12A and 12B.

When the vibratory body vibrates in frequencies higher than about three times the resonance frequency of the fluid within the tube member 30, the fluid within the tube member 30 is brought into a stationary state and therefore the dynamic damper 126 is considered as same as the conventional dynamic damper as shown in FIG. 14. Consequently, the dynamic damper 126 again makes its resonance vibration at the resonance frequency (a second resonance frequency) of the vibration system in which the elastic member 140 filled with the fluid serves as a spring, and the first and second frame members 128, 129, the fluid within the tube member 130 etc. serve as a mass. At excitation frequencies higher than the second resonance frequency, the displacement of the installation member 131 and the input to the installation member 134 become reverse in phase to each other and therefore the transmitted force can be reduced.

Figure 17:
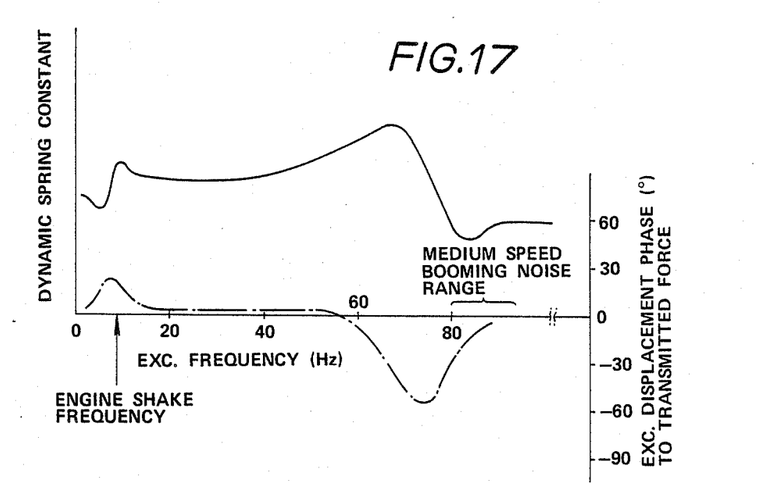
FIG. 17 is a graph showing the relationship between excitation frequency and dynamic spring constant in connection with the example of FIGS. 16A and 16B.

In case where the dynamic damper 126 is used in combination with a usual mount rubber in parallel relationship, the force transmission characteristics thereof becomes as shown in FIG. 17. Thus, in an automotive vehicle in which the dynamic damper 126 of FIGS. 16A and 16B is used in parallel relationship with an engine mount, it is possible to reduce both engine shake and booming noise by causing the first resonance frequency to coincide with the frequencies (around 10 Hz of engine shake) and causing the second resonance frequency to coincide with frequencies (60 to 70 Hz) immediately lower than a medium speed booming noise generating range (about 80 Hz).

Figure 18:
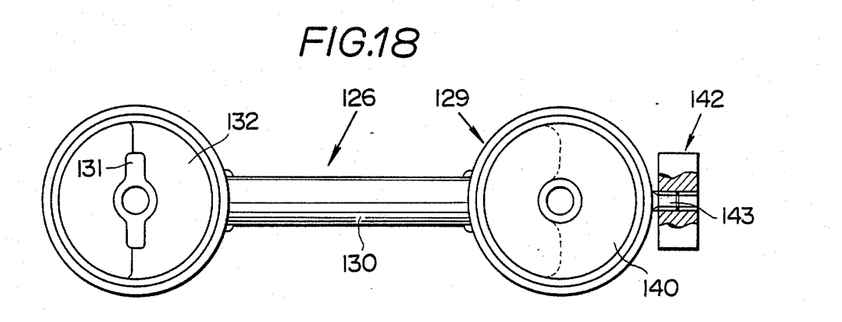
FIG. 18 is a transverse cross-sectional view similar to FIG. 16A but showing another modified example of the dynamic damper.

FIG. 18 illustrates another modified example of the dynamic damper 126 which is similar to that of FIGS. 16A and 16B with the exception that the second frame member 129 is provided with a weight installation member 143 to which a weight 142 is installed in order to adjust the above-mentioned second resonance frequency. Such an arrangement can prevent scattering of the second frequency due to scattering in characteristics of the elastic members 132, 140, thereby securely reducing booming noise.

Figure 19A:
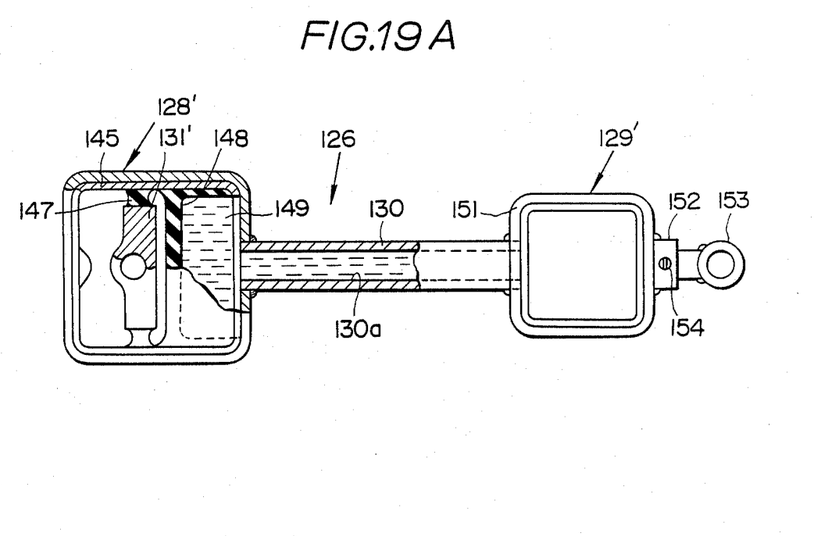
FIG. 19A is a transverse cross-sectional view of a further modified example of the dynamic damper.
Figure 19B:
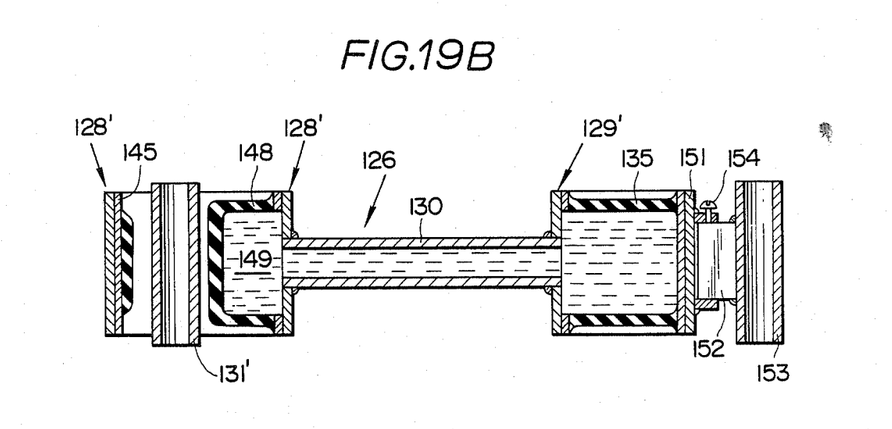
FIG. 19B is a vertical cross-sectional view of the dynamic damper of FIG. 19A.

FIGS. 19A and 19B illustrate a further modified example of the dynamic damper 126 which is similar to that of FIGS. 12A and 12B. In this example, a first frame member 128' is provided at its inner peripheral surface with an inner pipe member 145 to which a first installation member 131' is elastically movably connected through a rubber 147 which is bonded by way of adhesion due to baking. Additionally, the inner pipe member 145 is provided at its inner surface with a rubber 148 defining a hollow 149. It is to be noted that a clearance of about 0.5 to 2 mm is formed between the installation member 131' and the rubber member 148. An outer pipe member 151 of the second frame member 129' is provided with a second installation member 152 to which a third installation member 153 is fittingly connected. The location of the installation member 153 is adjustable by means of a screw 154.

With the thus arranged dynamic damper 126 of FIGS. 19A and 19B in a state where the first installation member 131' is securely connected to the vibratory body while the third installation member 153 is securely connected to the supporting body, the first installation member 131' cannot contact the rubber member 148 when the vibratory body vibrates at high frequencies and slight amplitudes, thus keeping constant the volume of the hollow 149 so that no flow of the fluid is produced within the tube member 130. In this case, although vibrational force is applied through the rubber member 147 to the supporting body, the transmitted force is considerably small because the rubber member 147 is of a relatively soft material and disposed to receive a load in shearing direction.

When the vibratory body vibrates at low frequencies and large amplitudes, the first installation member 131' pushes the rubber member 148 thereby to deform a hollow 149 developing pressure fluctuation. Such pressure fluctuation generates the flow of the fluid within the tube member 130, so that this arrangement serves as a dynamic damper at the resonance frequency. Thus, a high vibration damping effect can be obtained in a low frequency range while minimizing the transmitted force of the high frequency vibrations. Although a scattering is unavoidably made in the dimention of the clearance between the rubber member 148 and the first installation member 131' during production of the dynamic dampers 126, such a scattering can be compensated by adjusting the locational relationship between the second and third installation members 152, 153 in such a way that the screw 154 is tightened after sliding the third installation member 153 relative to the second installation member 152 in a state the screw 154 has been loosened.

Figure 20:
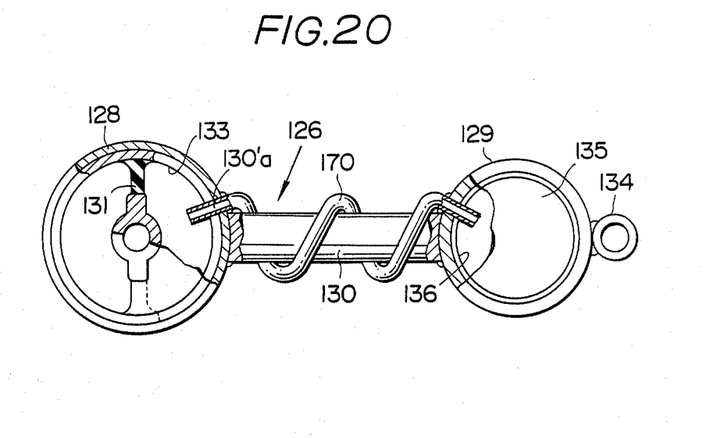
FIG. 20 is a plan view, partly in section, of a still further modified example of the dynamic damper.

FIG. 20 illustrates a still further modified example of the dynamic damper 126 which is similar to that of FIGS. 12A and 12B with the exception that a flexible pipe 170 made of a plastic material is provided to fluidly connect the first fluid chamber 133 with the second fluid chamber 36. The flexible pipe 170 is so disposed to be wound round a solid shaft 171 for securely connecting the first and second frame members 128, 129. With this arrangement, by virtue of the flexible piep 170, a small diameter and long orifice is formed thereby to obtain a greater vibration damping force.

Figure 21:
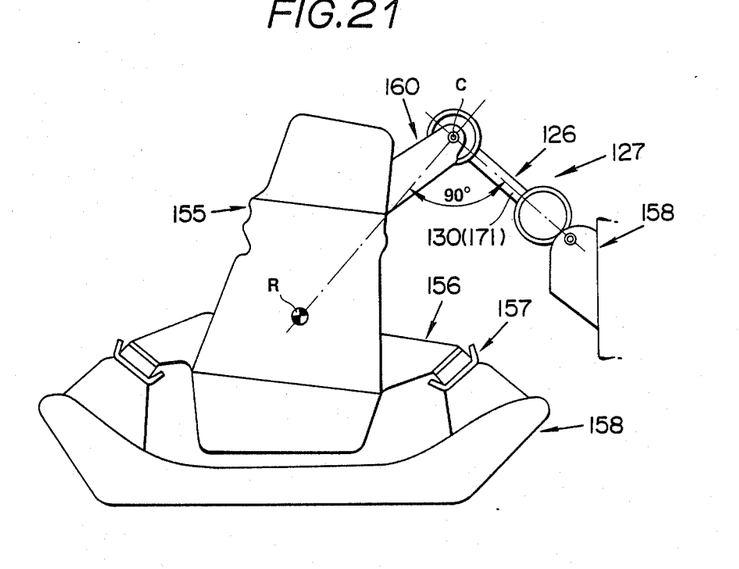
FIG. 21 is a schematic illustration of an installation mode of the supporting device.

FIG. 21 is an installation mode of the power unit supporting device 127 including the dynamic damper 126 shown in FIG. 11, 12A, 12B, 16A, 16B, 18, 19A, 19B and 20, in which the device is used in combination of an automotive engine 155 or power unit. In this mode, the engine 155 is installed through brackets 156 and rubber mounts 157 on a vehicle body 158. The dynamic damper 126 is installed between the engine 155 and a vehicle body 158 and located at a location farthest from a roll center R around which the engine rolls, i.e., the location where the displacement of the engine due to a roll mode is at the maximum level. More specifically, one installation member of the dynamic damper 126 is securely connected through a bracket 160 to the engine while the other installation member thereof is securely connected to the vehicle body 158. The dynamic damper 126 is so arranged that the longitudinal axis of the dynamic damper 126 intersects at an angle of about 90 degrees a line connecting the center C of the engine side dynamic damper installation member and the roll center R of the engine 155 in a plane perpendicular to an engine longitudinal axis (not shown) passing through the roll center R. It is to be noted that the maximum engine displacement due to the roll mode is made in the direction of the dynamic damper longitudinal axis. In this mode, the resonance frequency of the fluid within the dynamic damper 126 is coincident with the resonance frequency of the engine 155 in the direction of the roll of the engine.

The manner of operation of the arrangement of FIG. 21 will be discussed on case where the resonance in the direction of the engine roll is damped. The dynamic damper 126 does not support the static load of the engine 155 and therefore load support for the engine is made by the rubber mounts 157, so that the dynamic damper 126 can be installed freely at a suitable location independent from the rubber mounts 157. In the mode of FIG. 21, the dynamic damper 126 is installed at the location farthest from the engine roll center R and in the direction for effectively receiving the roll vibration, so that the largest amount of the engine displacement due to engine roll vibration is applied to the dynamic damper 126, thus most effectively damping vibration energy of the engine 155.

Figure 22:
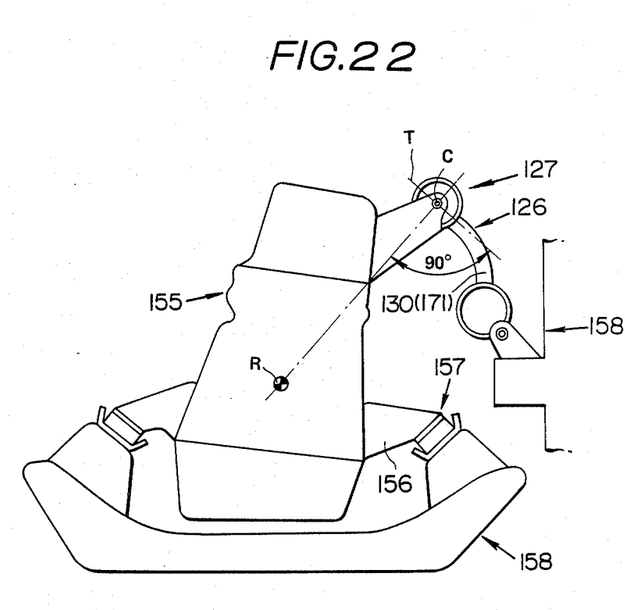
FIG. 22 is another installation mode of the supporting device.

FIG. 22 illustrates another installation mode of the power unit supporting device 127 similar to the mode of FIG. 21 with the exception that the tube member 130 (171) of the dynamic damper 126 is formed smoothly curved. In this mode, the dynamic damper 126 is so arranged that a line connecting the center C of the engine side installation member of the dynamic damper 126 and the engine roll center R intersects at an angle of about 90 degrees a tangent line T of the longitudinal axis of the tube member 130 (171) of the dynamic damper 126 at a location of the installation member center C in a plane perpendicular to an engine longitudinal axis (not shown) passing through the roll center R. Thus, with this arrangement, the same effect as in the example of FIG. 21 can be obtained while improving freedom in installation of the dynamic damper 126.

It is to be noted that, in the arrangements of FIGS. 11 to 13, 16A, 16B and 18 to 22, the resonance frequency of the fluid within the hole 30a, 30a' of the tube member 130, 170 is coincident with the resonance frequency of a resonant body including the whole supporting device 127 and the engine 155 upon closing the hole. Additionally, the resonance frequencies of the fluid within the hole 30a, 30a' and of the resonant body may be coincident with the frequency of engine shake.

What is claimed is:

1. A method, comprising:
   determining a first resonant frequency of a system comprising a vibratory body, a supporting body and a vibration damping device disposed therebetween having first and second fluid filled chambers not in communication with each other; and
   damping vibrations at said first resonant frequency in a system comprising a vibratory body, a supporting body and a vibration damping device disposed therebetween having first and second chambers which communicate with each other through a passage configured to impart a second resonant frequency to fluid received within said passage which substantially equals said first resonant frequency.

2. A method as claimed in claim 1 wherein said first resonant frequency is coincident with a frequency of engine shake.

3. A method as claimed in claim 1 wherein said vibratory body is a power unit and said supporting body is a vehicle body.

4. A method as claimed in claim 1 wherein said passage comprises an orifice having a cross section of about 0.15 cm$^2$ to 0.5 cm$^2$.

5. A method as claimed in claim 1 wherein said vibration damping device includes a rubber block interposed between said vibratory body and said supporting body.

* * * * *